(12) United States Patent
Smith et al.

(10) Patent No.: US 11,261,897 B2
(45) Date of Patent: Mar. 1, 2022

(54) STRUCTURAL FASTENER

(71) Applicant: Mag Daddy LLC, Wauconda, IL (US)

(72) Inventors: Michael Walter Smith, Palatine, IL (US); Daniel James Dickinson, Lincolnshire, IL (US); Zach Reusch, Lake Zurich, IL (US); John Heinzinger, Indian Creek, IL (US)

(73) Assignee: MAG DADDY, LLC, Wauconda, IL (US)

( * ) Notice: Subject to any disclaimer, the term of this patent is extended or adjusted under 35 U.S.C. 154(b) by 0 days.

(21) Appl. No.: 15/998,605

(22) Filed: Aug. 20, 2018

(65) Prior Publication Data

US 2019/0024693 A1 Jan. 24, 2019

Related U.S. Application Data

(63) Continuation-in-part of application No. 14/147,522, filed on Jan. 4, 2014, which is a continuation-in-part of application No. 13/476,957, filed on May 21, 2012, now abandoned, which is a continuation-in-part of application No. 11/564,840, filed on Nov. 29, 2006,
(Continued)

(51) Int. Cl.
| | |
|---|---|
| *F16L 3/24* | (2006.01) |
| *F16B 21/07* | (2006.01) |
| *F16B 5/06* | (2006.01) |
| *F16B 2/22* | (2006.01) |
| *F16L 3/10* | (2006.01) |

(Continued)

(52) U.S. Cl.
CPC ............. *F16B 21/075* (2013.01); *F16B 2/22* (2013.01); *F16B 5/0657* (2013.01); *F16B 7/0473* (2013.01); *F16B 21/086* (2013.01); *F16L 3/1091* (2013.01); *F16L 3/243* (2019.08); *Y10T 24/304* (2015.01); *Y10T 24/307* (2015.01)

(58) Field of Classification Search
CPC . F16L 3/24; F16L 3/243; F16B 37/043; F16B 7/0473; F16B 37/045; F16B 7/187; F24S 2025/804
See application file for complete search history.

(56) References Cited

U.S. PATENT DOCUMENTS 4,783,040 A * 11/1988 Lindberg ................ F16L 3/243
248/74.3
5,919,019 A * 7/1999 Fischer ................. F16B 37/043
411/112
(Continued)

*Primary Examiner* — Bradley Duckworth

(57) ABSTRACT

A strut receiver assembly provides springing attachment to a slotted structural member such as a strut. The strut receiver includes a bottom portion having a plurality of slots, a first side connected to the bottom portion and a second side connected to the bottom portion, thereby forming a U-shaped structure with the first and second sides. The plurality of first engagement springs each have an outward facing wing on the first side operable for springing attachment to a first rim on the slotted structural member. The plurality of second engagement springs each have an outward facing wing on the second side operable for springing attachment to a second rim on the slotted structural member. A band has a bottom portion, a first side having a first arm for engaging a first receiver slot and a second side having a second arm for engaging a second receiver slot.

23 Claims, 27 Drawing Sheets

Related U.S. Application Data now abandoned, which is a continuation-in-part of application No. 10/942,634, filed on Sep. 16, 2004, now Pat. No. 7,188,392.

(60) Provisional application No. 60/520,807, filed on Nov. 17, 2003.

(51) Int. Cl.
*F16B 7/04* (2006.01)
*F16B 21/08* (2006.01)

(56) References Cited

U.S. PATENT DOCUMENTS

| | | | | |
|---|---|---|---|---|
| 6,976,292 B2 * | 12/2005 | MacPherson | ........ | B60N 3/026 24/292 |
| 7,090,174 B2 * | 8/2006 | Korczak | ........ | F16L 3/222 248/61 |
| 7,226,260 B2 * | 6/2007 | Jackson, Jr. | ........ | F16B 21/076 411/112 |
| 8,590,223 B2 * | 11/2013 | Kilgore | ........ | H01R 4/26 52/173.3 |
| 8,714,495 B2 * | 5/2014 | Myers | ........ | F16B 2/12 248/74.1 |
| 8,800,120 B2 * | 8/2014 | Benedetti | ........ | F16B 5/0642 24/458 |
| 8,844,888 B1 * | 9/2014 | Gretz | ........ | F16L 3/2431 248/231.81 |
| 9,331,629 B2 * | 5/2016 | Cheung | ........ | H02S 20/23 |
| 9,562,554 B2 * | 2/2017 | Vidal | ........ | F16B 5/0258 |
| 9,574,589 B2 * | 2/2017 | Knutson | ........ | F16L 3/243 |
| 2002/0100146 A1 * | 8/2002 | Ko | ........ | B60J 3/0217 24/295 |
| 2005/0236861 A1 * | 10/2005 | Slobodecki | ........ | B60R 13/0206 296/39.1 |
| 2011/0084179 A1 * | 4/2011 | Wiedner | ........ | F16L 3/24 248/67.7 |
| 2011/0163562 A1 * | 7/2011 | Smith | ........ | B60R 13/0206 296/1.07 |
| 2018/0245716 A1 * | 8/2018 | Nijdam | ........ | F16L 3/24 |
| 2018/0335072 A1 * | 11/2018 | Wilson | ........ | F16B 37/0842 |
| 2018/0347614 A1 * | 12/2018 | Reznar | ........ | F16B 37/046 |

* cited by examiner

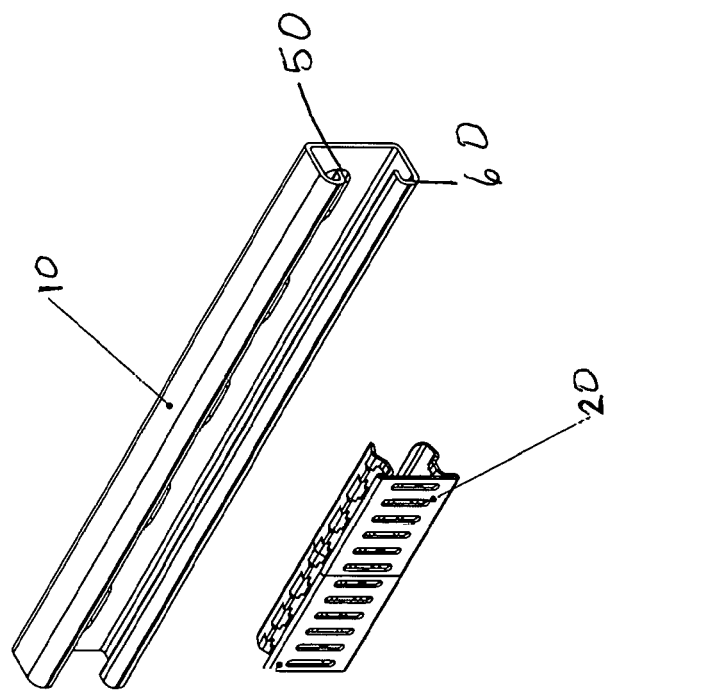
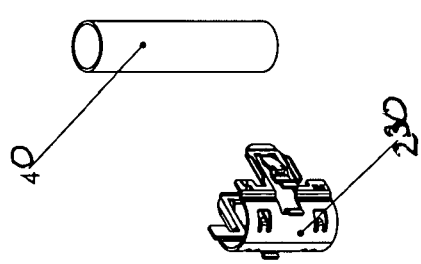
FIG. 2

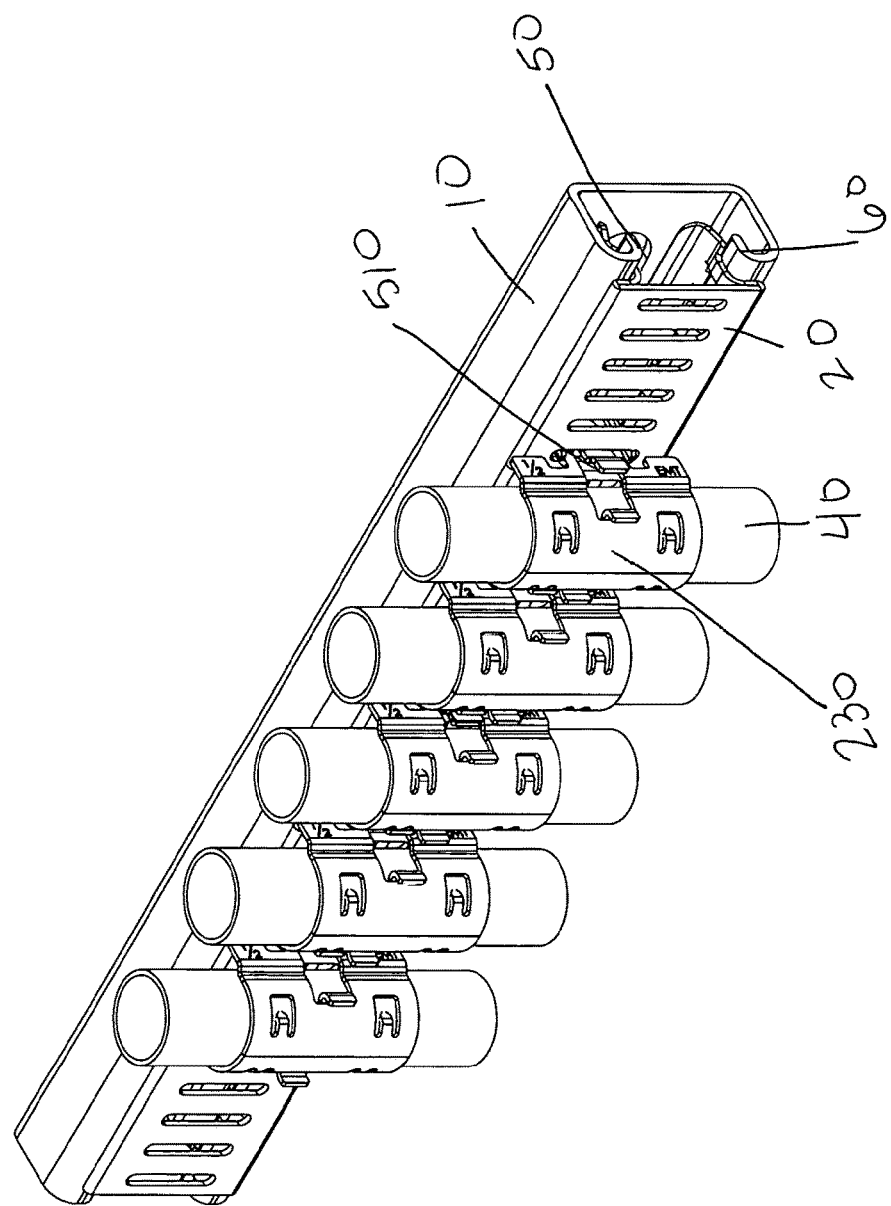

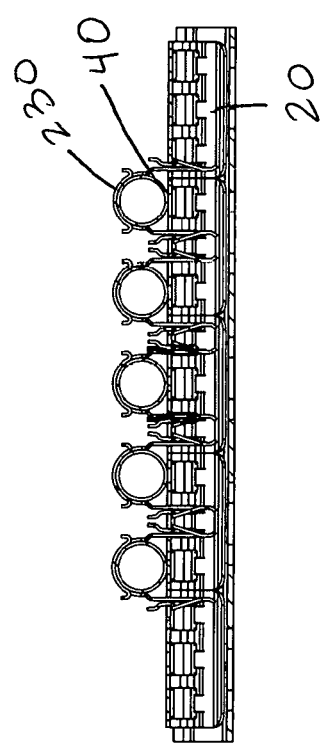

US 11,261,897 B2

STRUCTURAL FASTENER

RELATED APPLICATIONS

This application is a continuation in part application of U.S. patent application Ser. No. 14/147,522 entitled "Spring fastener" filed on Jan. 4, 2014, which is a continuation in part application of U.S. patent application Ser. No. 13/476,957 entitled "Spring fastener with highly improved lever/angle pulling force" filed on May 21, 2012, which is a continuation in part of U.S. patent application Ser. No. 11/564,840 entitled "Spring fastener with highly improved lever/angle pulling force" filed on Nov. 29, 2006, which is a continuation in part of U.S. Pat. No. 7,188,392 entitled "Spring fastener with highly improved lever/angle pulling force", filed on Sep. 16, 2004, which claims priority from provisional application 60/520,807 filed on Nov. 17, 2003 and owned by the instant assignee.

FIELD OF THE INVENTION

The invention relates generally to devices for fastening objects, and more particularly to a fastener and strut hangers to secure construction components or to attach onto an engagement structure, such as a chassis, a strut, a hollow substrate, a wall, a plate or any suitable surface.

BACKGROUND OF THE INVENTION

A number of devices and fasteners are currently available to secure cables or for fastening pipes, conduit and cables to a building structure. Similarly, threaded rods, struts, panels, body panels, building structure, and electrical conduit are fastened to the chassis or frame of a building. For example, spring nuts and other devices are used to secure bolts and threaded rods to a strut or truss. Clamps and cable ties are used to secure cables in electrical wiring and boxes. As used herein, a strut refers to a u-shaped bracket having holes to allow for attachment at various points and to facilitate a variety of construction situations. The chassis of the building may include any substrate, plate, roof or ceiling support, structural framework, chassis component or subcomponent, support component, wall or any suitable object or combination.

Attaching wires or cables to a building structure, electrical box or body panel typically requires securing threaded rods, bolts, wires, cable clamps, electrical boxes, screw in cable clamps, straps, tape or clips already fastened to a wire assembly. The devices require two hands to manipulate and install and require time to screw a bolt or nut. If the installed device is not level, then the installer must loosen the screw or bolt and then re-align the device and retighten, thus extending the installation time even further. At least some of the fasteners require extended height or blind insertion and installation of the fasteners because the installer is not able to view the fastener or the mounting point on the body panel. These known fasteners require fastening with a screwdriver or wrench and thus are cumbersome and difficult to install, especially in inaccessible areas. Nor can they be installed without a screwdriver or wrench for example on an electrical box, conduit or in automobile environments that can be somewhat harsh. Further, replacement of an installed, broken nut, rod or strut requires removal and can again be difficult.

BRIEF DESCRIPTION OF THE DRAWINGS

FIG. 2 is an exploded view of a strut receiver assembly according to another embodiment;

FIG. 26 is a perspective view of a strut receiver in an engaged position with multiple cages and a strut member operable to attach to multiple pipes according to another embodiment; and FIG. 27 is a side view of a strut receiver in an engaged position with multiple cages and a strut member operable to attach to multiple pipes according to another embodiment.

DETAILED DESCRIPTION OF THE PREFERRED EMBODIMENTS

Figure 1:
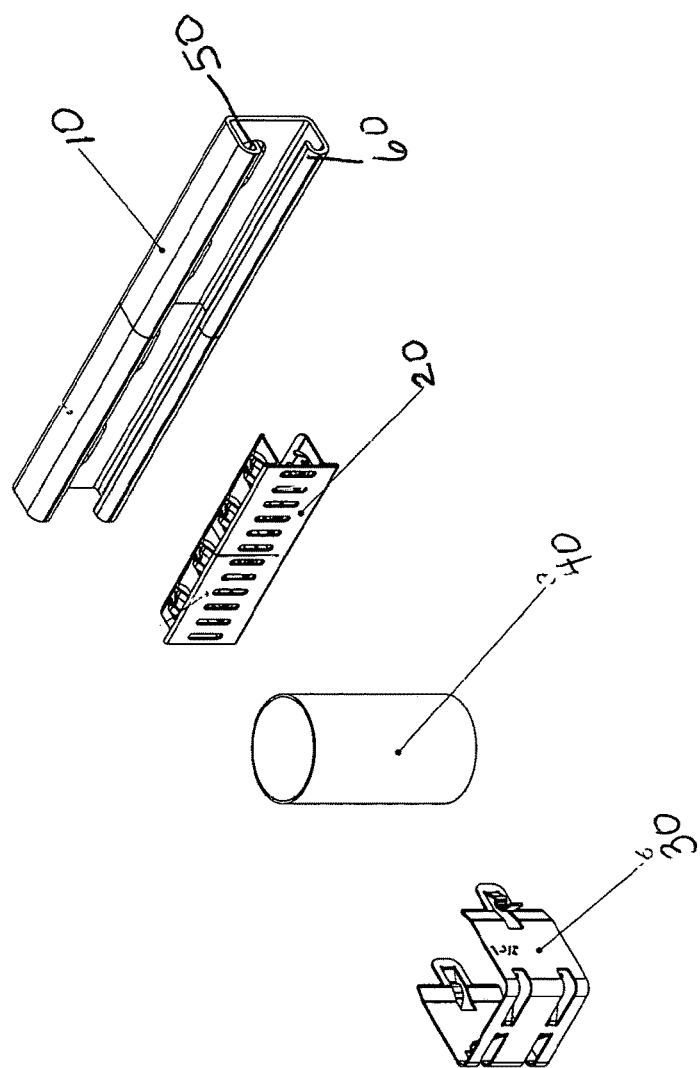
FIG. 1 is an exploded view of a strut receiver assembly operable to attach to a pipe according to one embodiment.
Figure 3:
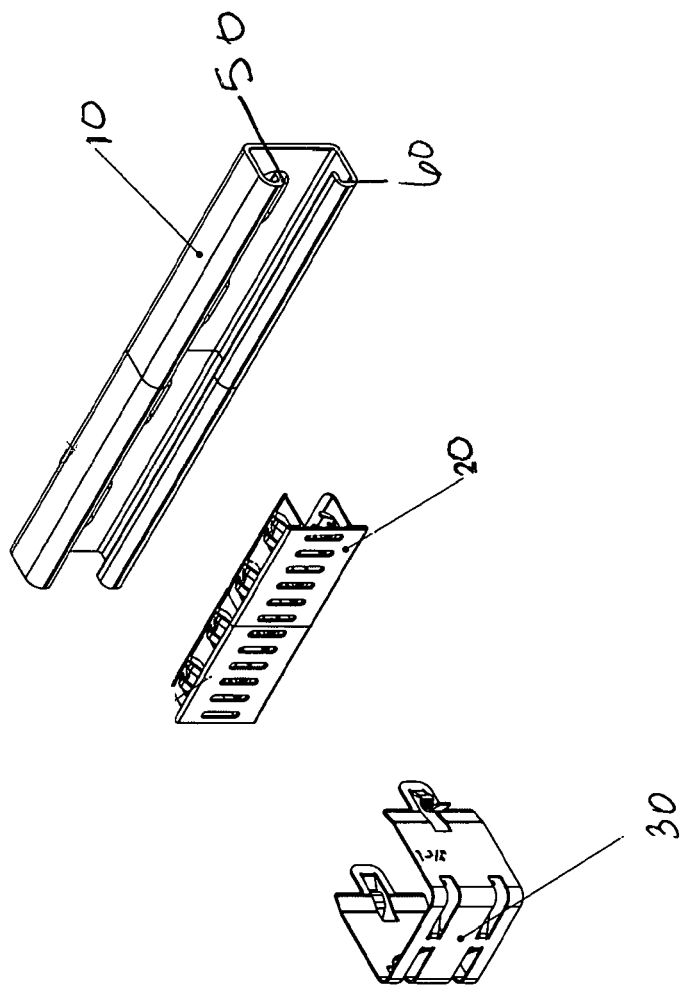
FIG. 3 is an exploded view of a strut receiver assembly according to one embodiment.
Figure 4:
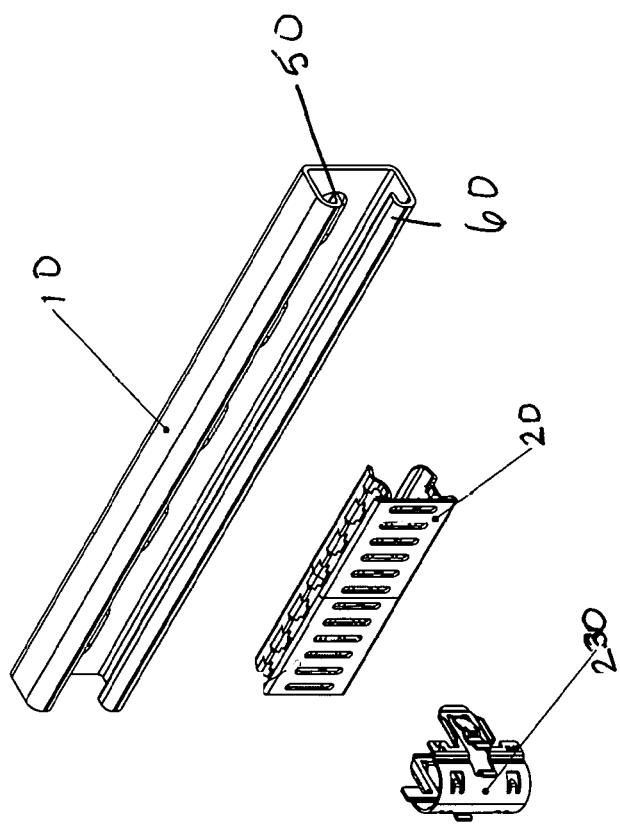
FIG. 4 is an exploded view of a strut receiver assembly according to another embodiment.

A strut receiver assembly provides springing attachment to a slotted structural member such as a strut. The strut receiver includes a bottom portion having a plurality of slots, a first side connected to the bottom portion and a second side connected to the bottom portion, thereby forming a U-shaped structure with the first and second sides. The plurality of first engagement springs each have an outward facing wing on the first side operable for springing attachment to a first rim on the slotted structural member. The plurality of second engagement springs each have an outward facing wing on the second side operable for springing attachment to a second rim on the slotted structural member. A band has a bottom portion, a first side having a first arm for engaging a first receiver slot and a second side having a second arm for engaging a second receiver slot.

According to one embodiment, the strut receiver has an engagement region on the wings. The engagement regions may engage an edge of a channel rib.

According to one embodiment, wings on each of the ends of the cage engage corresponding slots on the receiver to stabilize and retain the cage on the receiver.

The receiver and the cage are comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass and carbon fiber.

During installation, the receiver may be easily snapped into the strut and the band may be easily and quickly snapped into the receiver thus quickly attaching the pipe to the strut. This reduces the amount of time to attach pipes, conduit electrical wires or any suitable construction materials to a building structure.

The receiver permits relatively easy insertion of the strut into a building chassis, pillar, structure, door, roof or suitable panel while providing a relatively high level of strength and support. Assembly of the band onto the receiver is very easy and requires no or a relatively low level of installation effort and as a result provides many ergonomic advantages. The receiver and band eliminates the need for threading a clamp or nut on a long threaded rod, and thus significantly reduces the clamp nut-threaded rod assembly. Also, the installer can snap the receiver and band with one hand whereas the prior art conventional nuts require two hands to hold the clamp or nut and the structural construction member.

The relatively easy attachment is particularly advantageous for operators who repetitively install pipes, conduit electrical wires or any suitable construction materials onto the building chassis. The relatively easy installation required for inserting the receiver and band into the building chassis may result in fewer injuries to the assembly workers, including injuries related to repetitive stress syndrome. Further by selecting a receiver and band or reducing the number of different receiver and band for different strut lengths and thicknesses, confusion during assembly is eliminated since the same type or a reduced number of fasteners may be used for all or most struts. Thus, an electrician, installer, or assembly worker need not worry about selecting the wrong fastener.

The relatively high level of strength, characteristic of the receiver and band, securely attaches to the building or chassis. Further, the receiver and band quickly and easily adjusts to the structural member and minimizes long tedious threading of nuts and clamps, flexing of the fastener and structural members, pushing by operators, vibration and thermal expansion. For example, since conventional top and bottom nuts between the strut are required to clamp the strut, changes in length of the strut or rod requires untightening and tightening of the nuts. In contrast, the receiver is removed from the strut slot may be easily inserted into the desired position on the structural member. The receiver and band may also fasten to plastic and/or metal engagement structures. The receiver and band nut may be made of anti-corrosive material such as plastic or treated metal to provide long reliable service life.

Yet another advantage is that the receiver and band is relatively easy to manufacture using relatively inexpensive manufacturing processes and materials. The use of the receiver and band decreases installation effort and time, assembly and production costs, increases worker productivity and efficiency, improves reliability and quality and decreases overall assembly, warranty and maintenance costs. The receiver and band improves reliability both in the short term and in the long term, while further improving safety and quality.

FIGS. 1-4 are exploded views of a strut receiver assembly 100, 200, 400 providing springing attachment to a slotted structural member 10 such as a structural member commonly known as a "strut." Strut receiver assembly 100 includes a strut receiver 20, and a band 30 operable to detachably couple a pipe 40.

FIGS. 5-12 illustrate the strut receiver 20, 620 including a bottom portion 500, 630 having a plurality of slots 510, a first side 520, 640 connected to the bottom portion 500 and a second side 530, 650 connected to the bottom portion 500, thereby forming a U-shaped structure with the first side 520, 640 and second sides 530, 650. The sides 520, 530, 640, 650 have corresponding plurality of first engagement springs 540, and the second engagement springs 550 each have an outward facing wings 560, 570, 660, 670.

Figure 5:
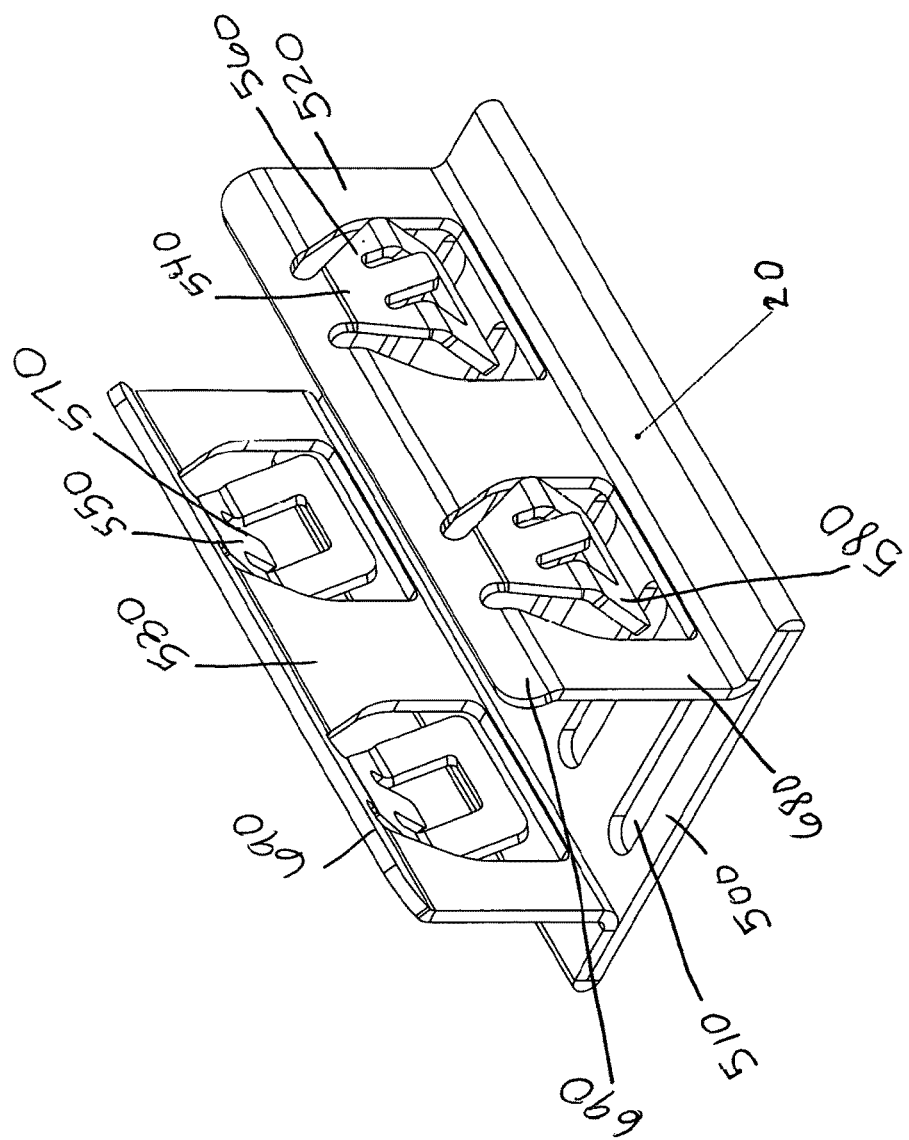
FIG. 5 is a perspective view of a strut receiver according to one embodiment.

FIG. 5 shows each engagement spring 540, 550 further comprises arms 680 extending from the bottom portion 500, a curved tip 690 at and end of the arm 680 opposite the bottom portion 500. The curved tip 690 allows the insertion and lead in of the arms 680. For example, the curved tip 690 allows the receiver 20 to locate its position properly relative to the strut 10. The curved tip facilitates to bend the arms 680 during insertion into the rim 50, 60 on the slotted structural member 10 easier. The arms 680 include the wings 560, 570, 660, 670 in between the bottom portion 500 and the curved tip 690.

Figure 6:
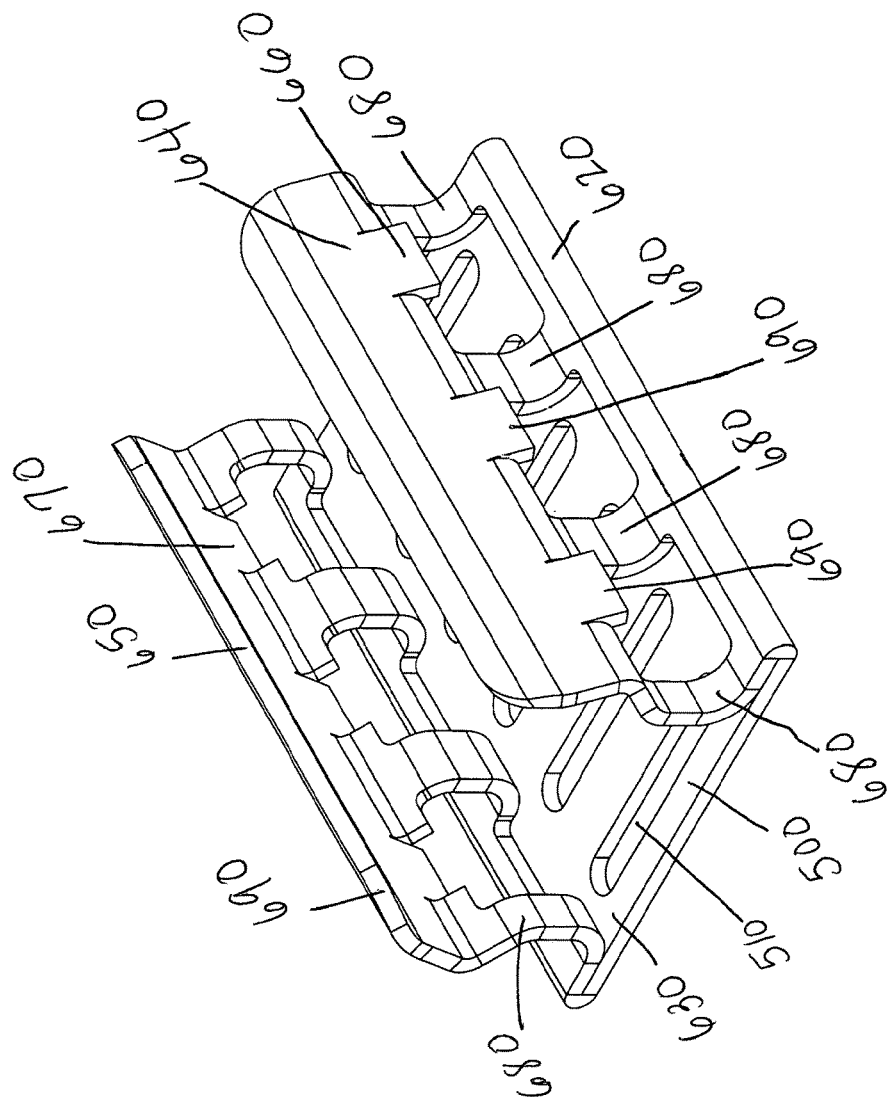
FIG. 6 is a perspective view of a strut receiver according to another embodiment.
Figure 7:
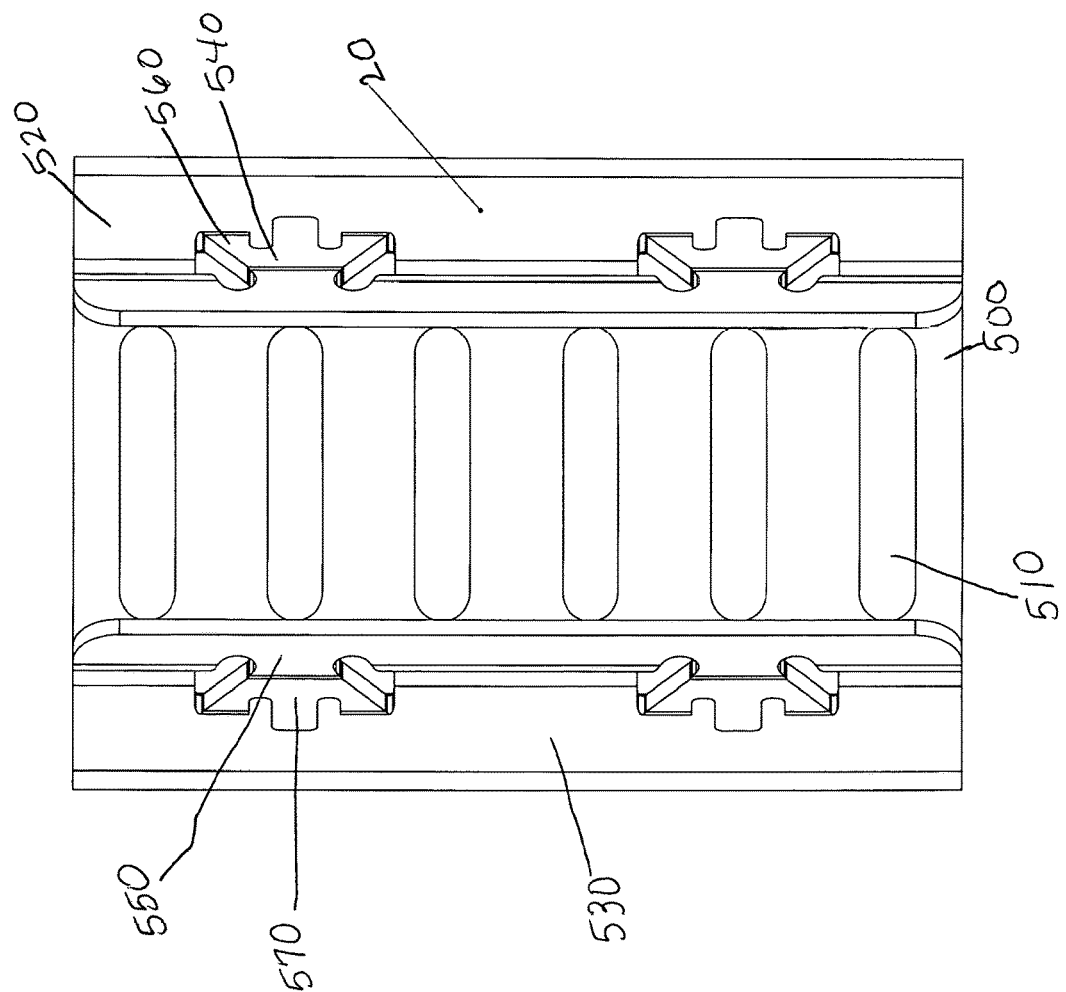
FIG. 7 is a top view of a strut receiver according to another embodiment.
Figure 8:
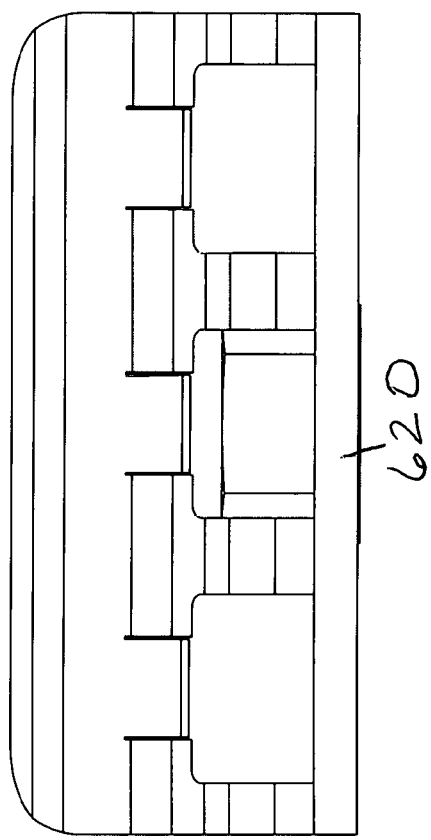
FIG. 8 is a side view of a strut receiver according to another embodiment.
Figure 12:
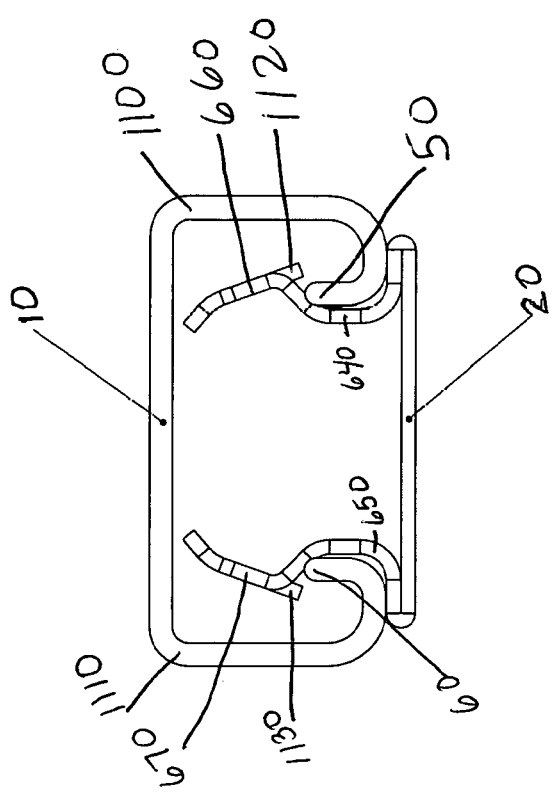
FIG. 12 is a side view of a strut receiver in an engaged position with a strut member according to another embodiment.

FIGS. 6 and 12 shows a strut receiver 20 according to another embodiment. The wings 560, 570, 660, 670 include sheer tabs 690 to snap into a rim 50, 60 and wherein the arms 680 engage a rim 50, 60 edge when in an engage position.

Figure 9:
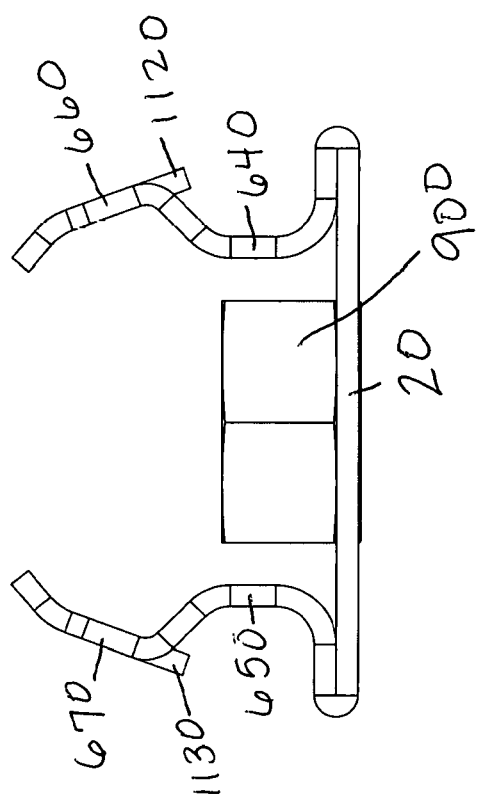
FIG. 9 is side view of the strut receiver and nut according to another embodiment.
Figure 10:
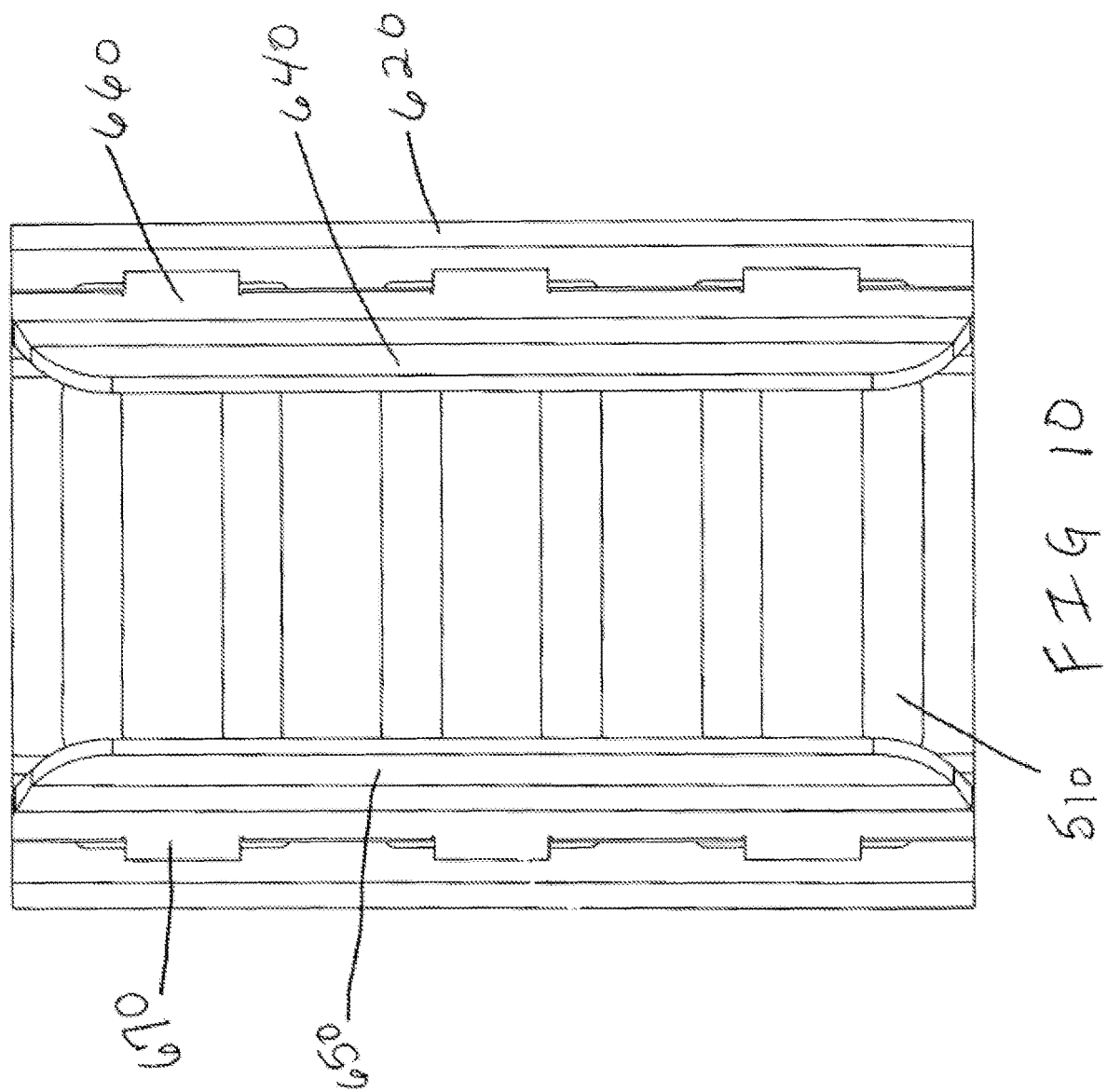
FIG. 10 is a top view of a strut receiver according to another embodiment.

FIG. 9 illustrates one embodiment wherein the bottom portion 500, 630 has a nut 900 operable for receiving a threaded fastener such as a screw or rod or any suitable threaded cylinder, not shown. The nut 900 may be welded, cast, forged, or attached to the bottom portion 500, 630 using any suitable attachment means. As discussed previously, the threaded fastener may be a hanger commonly used in construction and for attachment to struts 10.

Figure 11:
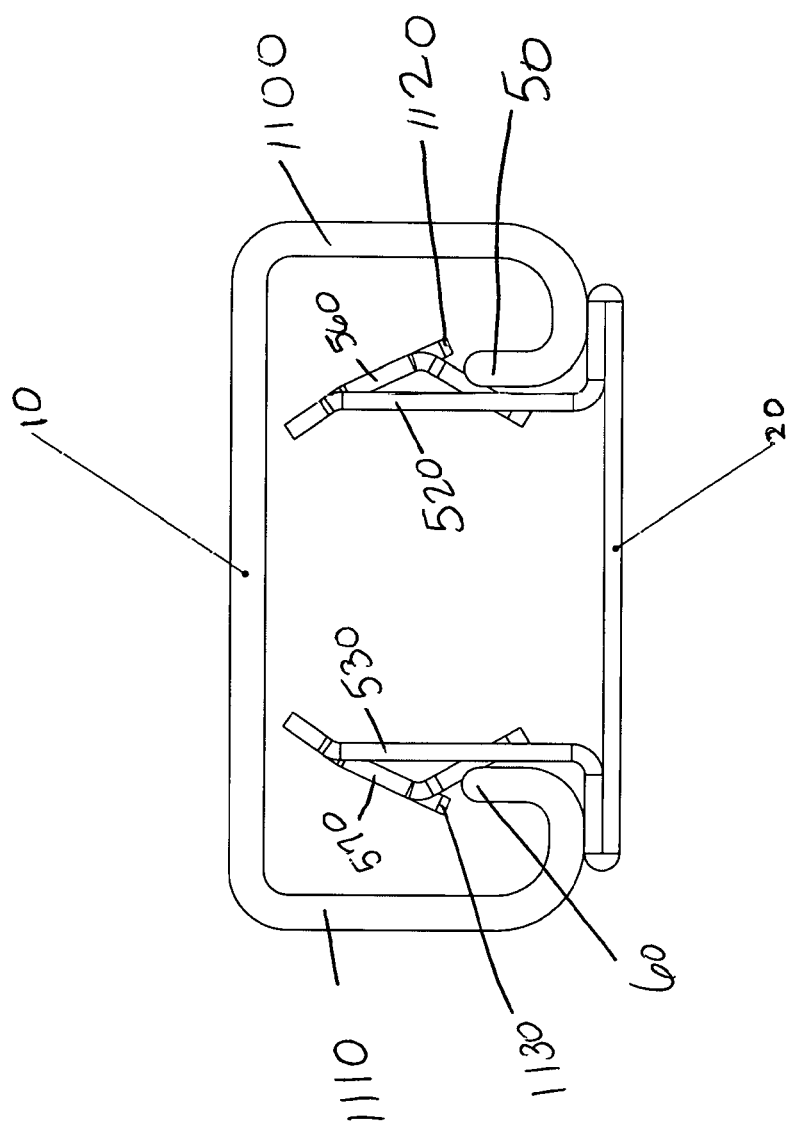
FIG. 11 is a side view of a strut receiver in an engaged position with a strut member according to one embodiment.

FIGS. 11 and 12 illustrate outward facing wings 560, 660 on the first side 520, 640 are operable for springing attachment to a first rim 50 on the slotted structural member 10. The plurality of second engagement springs 550 each have an outward facing wing 570, 670 on the second side 530, 650 are operable for springing attachment to a second rim 60 on the slotted structural member 50. In other words, the wings 560, 660, 570, 670 are operable for springing attachment to rim 50, 60 of the inside channel walls 1100, 1110 of the slotted structural member 10.

According to one embodiment, the wings 560, 660, 570, 670 further comprise a hook 1120,1130 at an open end of the wing 560, 660, 570, 670 extending into an inside rim or lip 50, 60 on the structural member 10. For example, the hook 1120, 1130 upon insertion snaps over and partially around the rim 50,60 in order to hook and thus impede removal of the receiver 20, 620 from the slotted structural member 10. A removal tool such as a screwdriver may be used to pry or bend hooks 1120, 1130 away from lips 50, 60 or towards each other to facilitate removal.

According to one embodiment, first side engagement region 520 is a depression 580 and the second side engagement region 530 is a depression 580' not shown but similar, as described in U.S. Pat. No. 7,188,392 hereby incorporated by reference.

FIGS. 13-18 illustrate a band 30, 230 having a bottom portion 1300, 1700 a first side 1310 having a first arm 1320, 1600 for engaging a first receiver slot 510 and a second side 1330 having a second arm 1340, 1600' for engaging a second receiver slot 510'. The arms 1320 form a u-shape such that the horizontal portion of the U-shaped portion of the arms 1320 has a wing 1340, 1820 extending from the arms 1320. The wings 1340, 1820 further comprise a servicing tab 1370, 1610 on each wing for removably retaining the band into the first and second slots. The wings 1340, 1820 engage the receiver slots 510 with a knuckle 1350, 1800 such that the knuckle 1350, 1800 pushes the wing 1340, 1820 inward during insertion into the slot 510. According to one embodiment, the knuckle 1350, 1800 further comprises a depression 1840 on each knuckle 1350, 1800 to allow for low insertion force and a relatively high extraction force when engaging the receiver slots 510. As the knuckle 1800 pinnacle passes through the slot 510, the knuckle 1800 snaps out until the cradle 1360,1830 portion of the wing 1820 rests on the inside of slot 510 during an engaged position.

Figure 14:
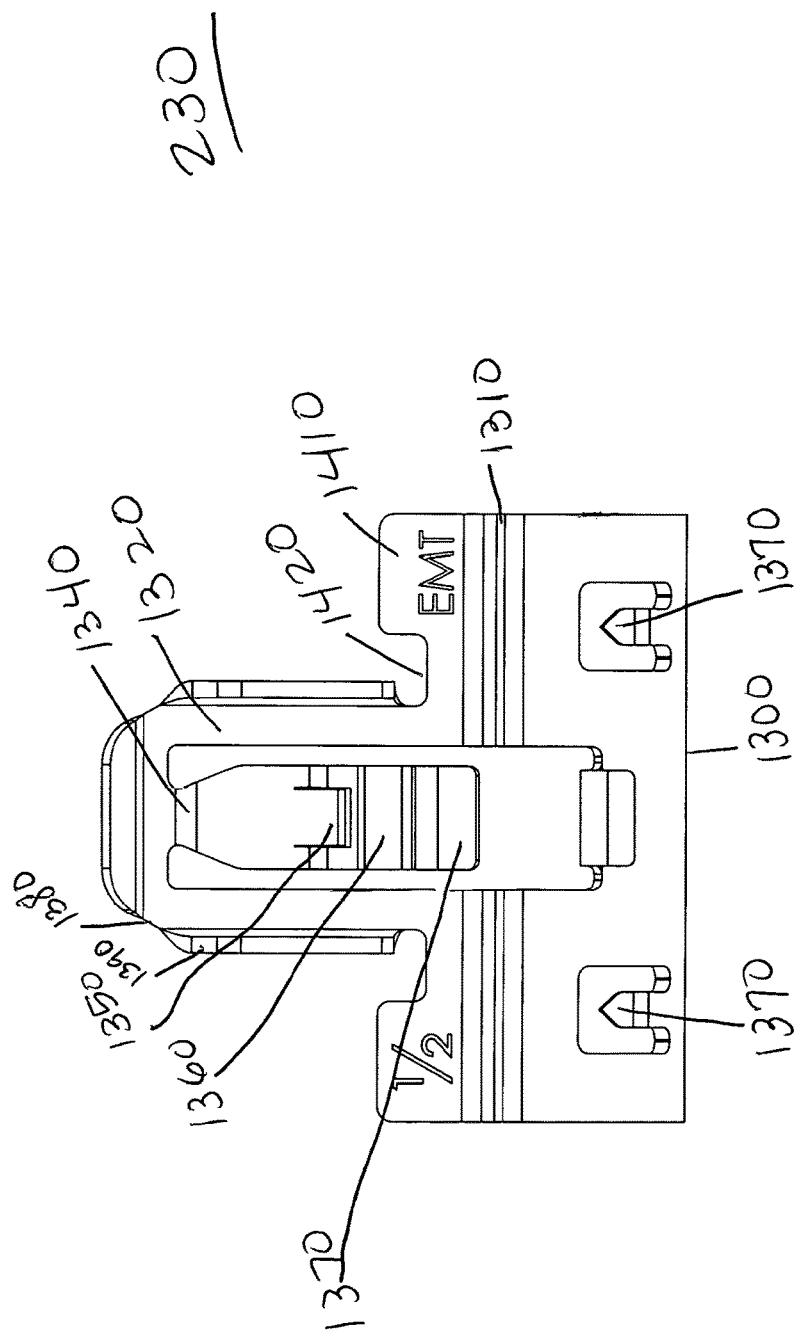
FIG. 14 is a side view of a cage shown in FIG. 13 rotated 90 degrees according to one embodiment.
Figure 15:
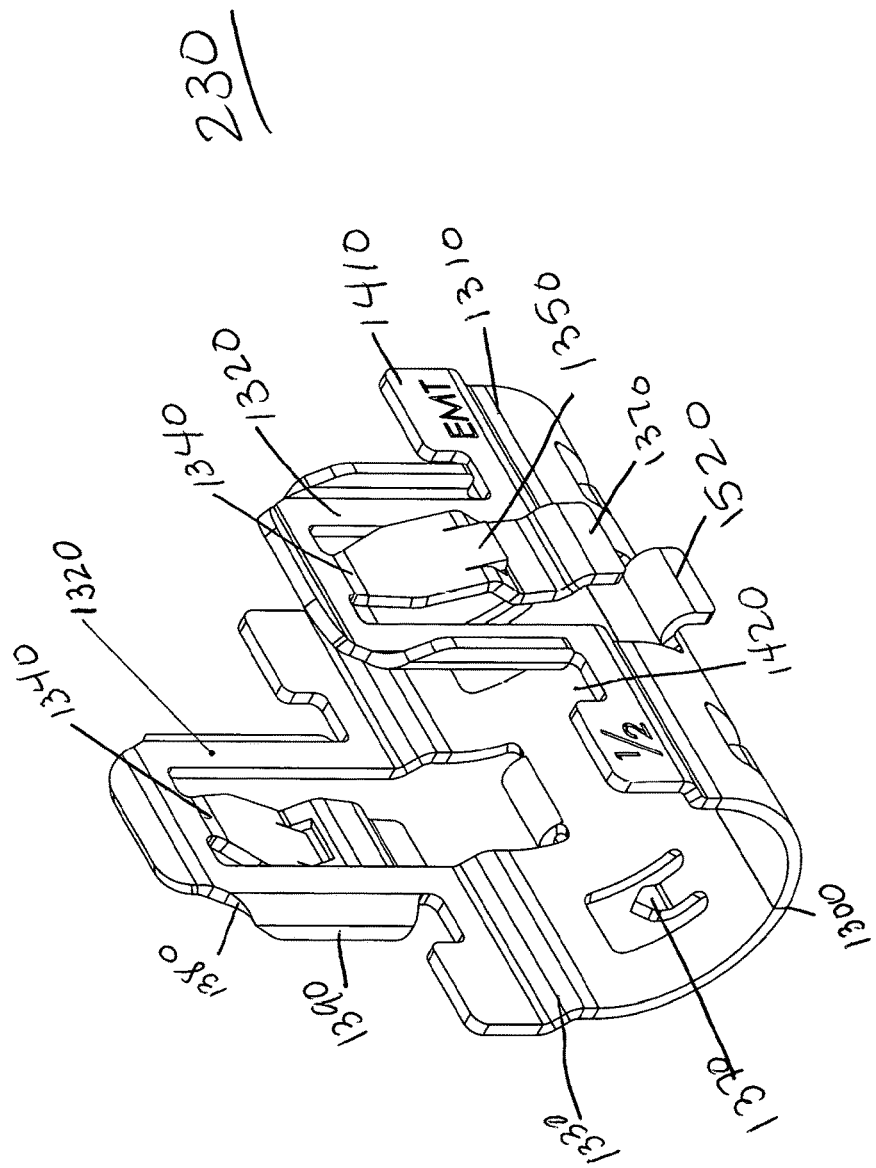
FIG. 15 is a perspective view of a cage according to one embodiment.
Figure 16:
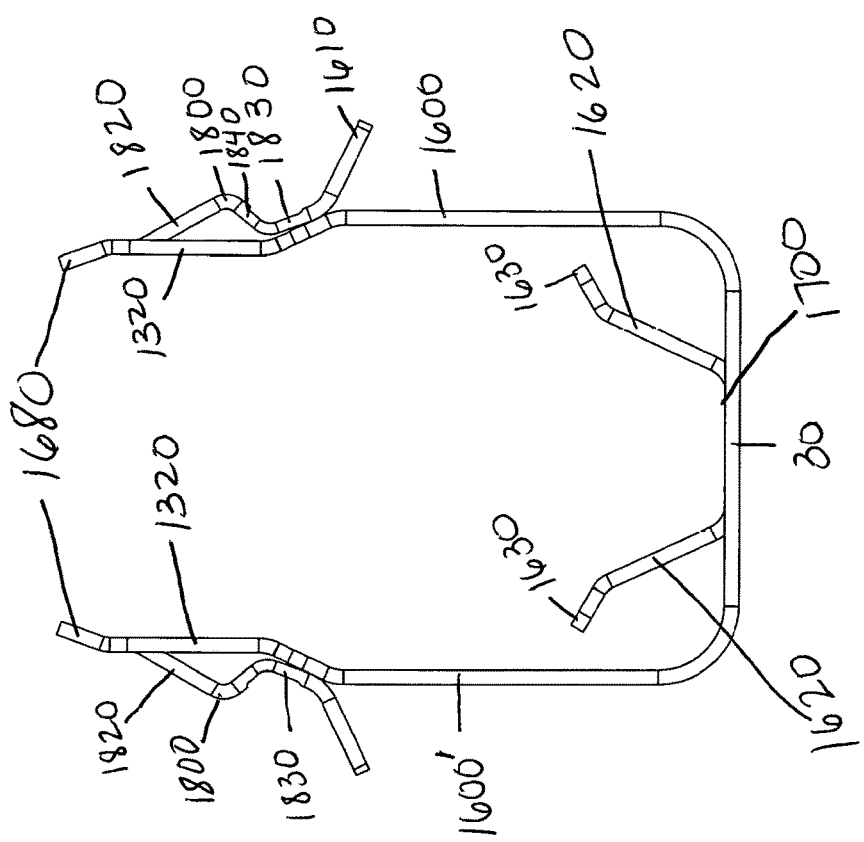
FIG. 16 is a side view of a cage according to another embodiment.
Figure 17:
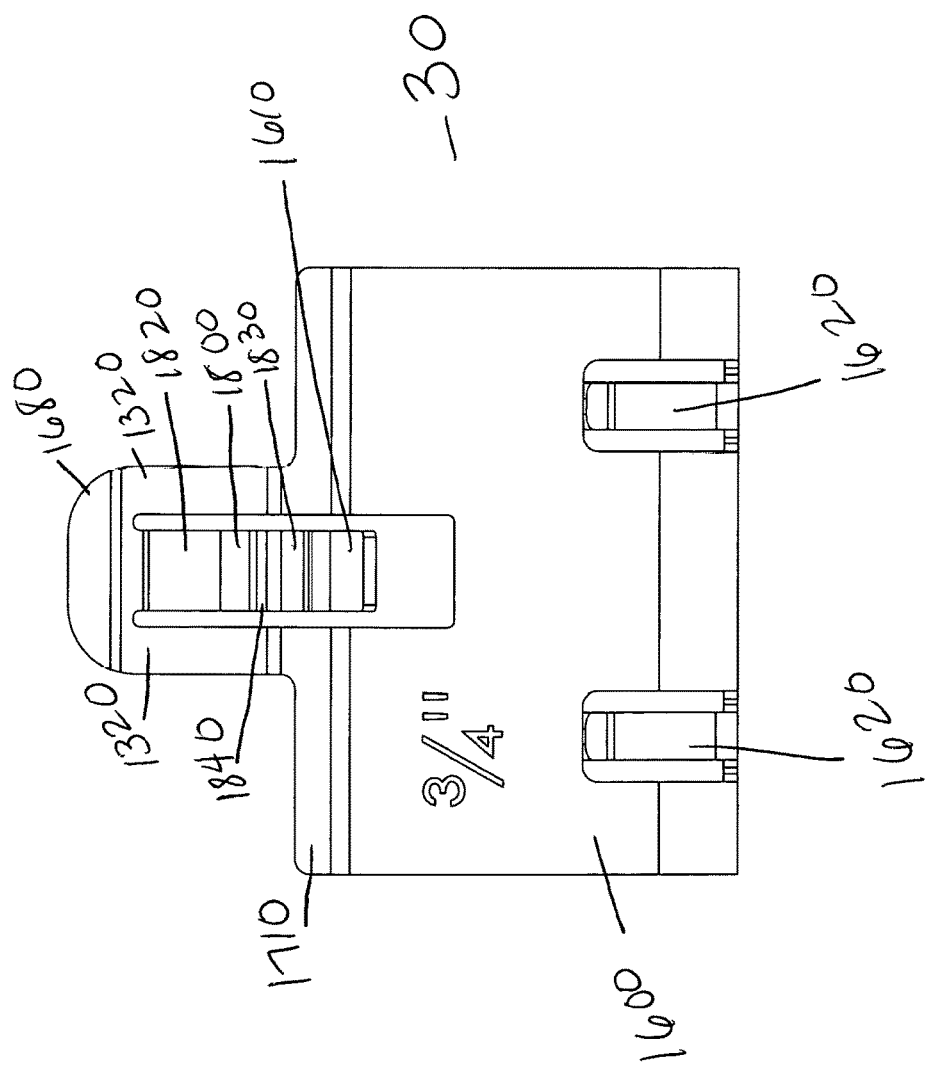
FIG. 17 is a side view of a cage shown in FIG. 16 rotated 90 degrees according to another embodiment.
Figure 18:
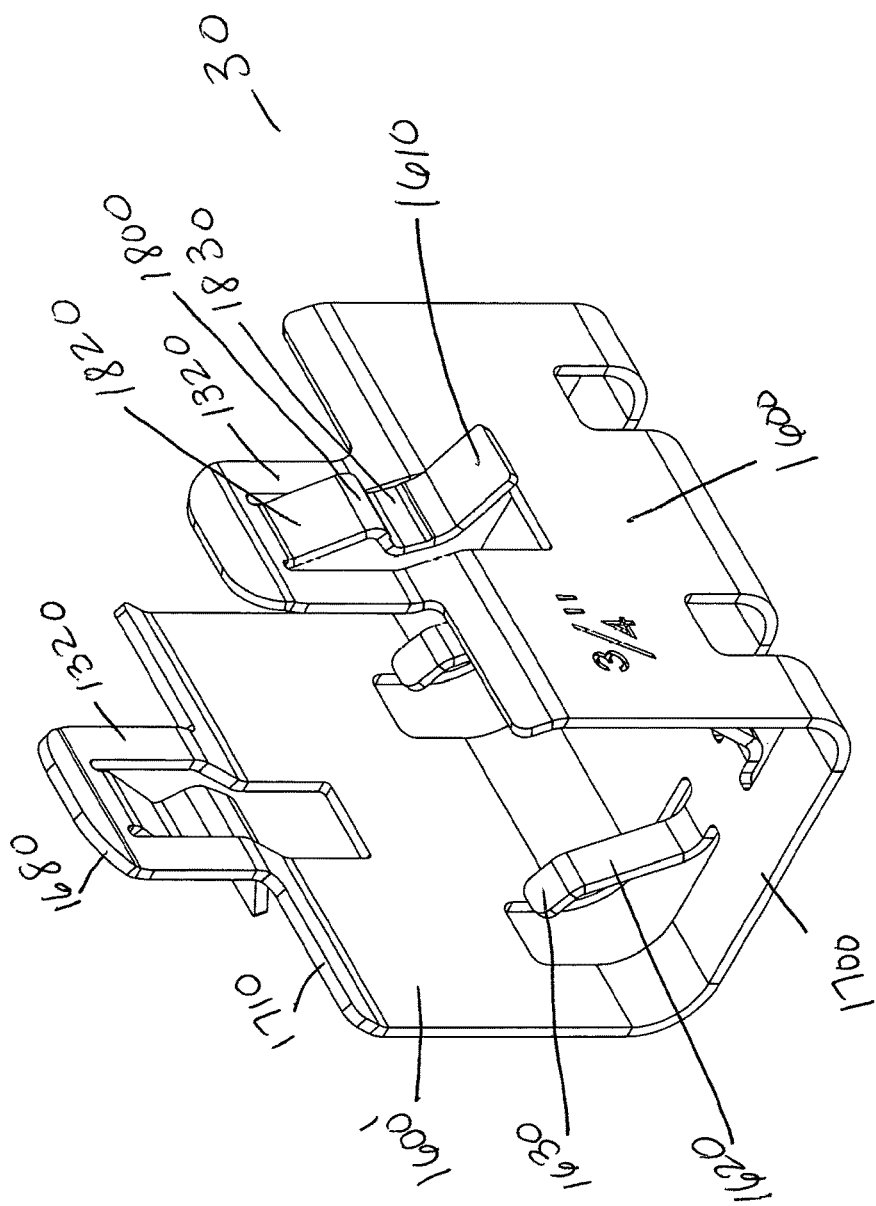
FIG. 18 is a perspective view of a cage according to another embodiment.

FIGS. 13-18 illustrate the band bottom 1300, 1700 portion further comprises a plurality of tensioner prongs or "barbs" 1370, 1620 to engage a conduit 40 when the band 30, 230 is in an engaged position with the receiver 20. Barbs 1370, 1620 will touch surface of the conduit 40 during engagement and will flex, and maintain pressure to prevent conduit 40 from sliding back and forth. Also barbs 1370, 1620 take up tolerance between the band 30, 230 and the conduit 40, so there may be a suitable resulting gap between conduit 40 and the band 30, 230. This way a range of different diameter conduit 40 could fit within a band 30, 230. Different shapes of pipe, such as square, oval, triangular or any suitable shape of pipe 40 are contemplated. As the square band 30 shown in FIGS. 16-18 is inserted during engagement, pipe 40 is pushed and depending on the relative diameter will cause square band 30 to bend into a rounded shape and in combination bends with the springing action of barbs 1620, takes a set. For example, bending goes beyond the modulus of elasticity of the metal in band 30 and changes the shape and the spring rate, and perhaps the pipe 40 may become loose. According to one embodiment, the prongs 1370, 1620 accommodate different pipe sizes such as pipe 40. For example, the curved and/or sharp point 1370,1630 digs into pipe 40 body.

Each arm 1320, 1340, 1600, 1600' on the band has a tapered tip 1380, 1680 at the end of wing 1340, 1840. Each arm 1320, 1340, 1600, 1600' on the band 30, 230 has a curved tip 1380, 1680 at the end of the wing 1340, 1840. Curved tip 1380, 1680 are sufficiently curved so that as inserted the wings 1340, 1840 open as necessary and ease insertion. During heat treatment, the curved portion may shrink causing the diameter to decrease and thus the curved tips' tapered tip 1380, 1680 allow easy insertion of the tips tapered tip 1380, 1680 into the slots.

Figure 13:
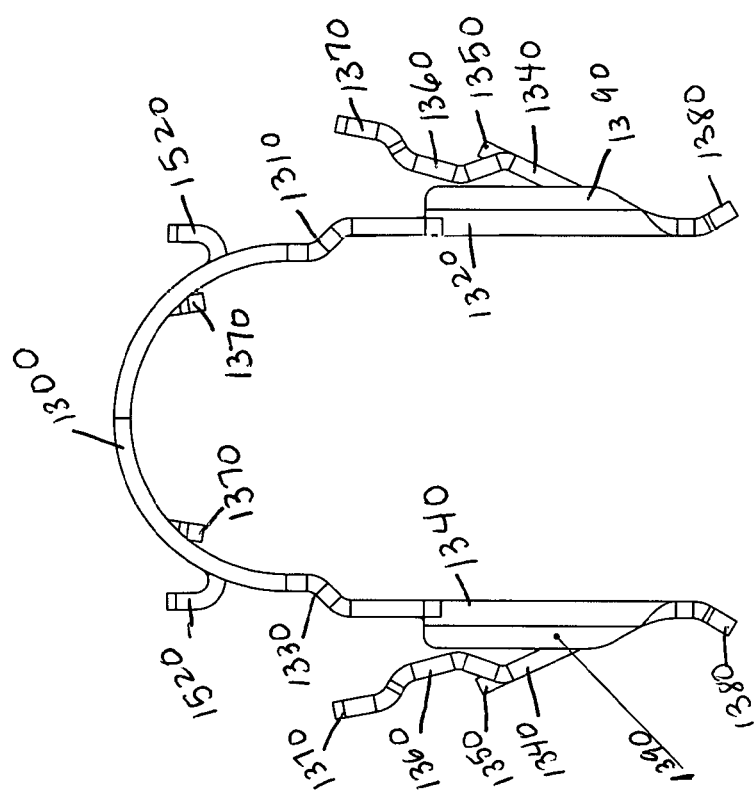
FIG. 13 is a side view of a cage according to one embodiment.

FIGS. 13, 14, 15 also illustrate a flange 1390 on band 230. Due to the bend in flange 1390, the bent flange 1390 fills hole, such as the width of the hole, where width is just below width of slot 510. This prevents rocking and rotation of the band 230.

Tapered tip 1380, 1680 functions as a lead in and allows the wing 1340, 1840 to locate the band 30. Tapered tip 1380, 168 makes insertion into the slot 510 easier, then during insertion, the edge of the wing 1820 engages the slot 510, and snaps over the slot 510.

Each arm 1320, 1340, 1600, 1600' on the band 30, 230 has a shoulder stop 1410, 1710. Shoulder stop 1410, 1710 creates a hard stop during insertion. Gap 1420 between flanges 1390 and shoulder 1410, 1710 is material needed to bend to form angle in flange 1390. Wall shoulder 1410, 1710 is thus vertical to make shoulder 1410, 1710 strong. Within the receiver 20 in between slots 510 holding wing knuckle tab 1370 needs to be strong thick enough to hold clip band 30, 230.

Figure 23:
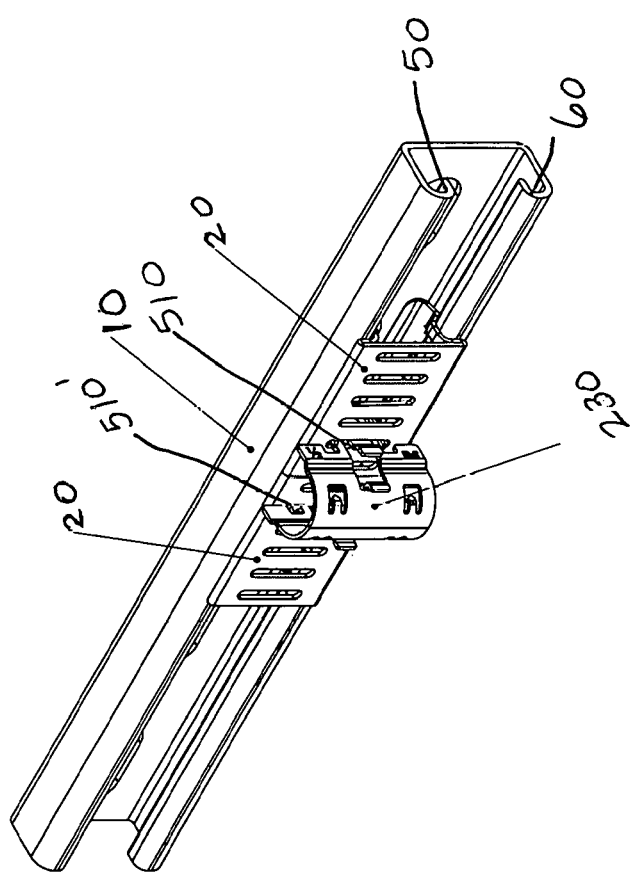
FIG. 23 is a perspective view of a strut receiver in an engaged position with a cage and strut member according to another embodiment.
Figure 25:
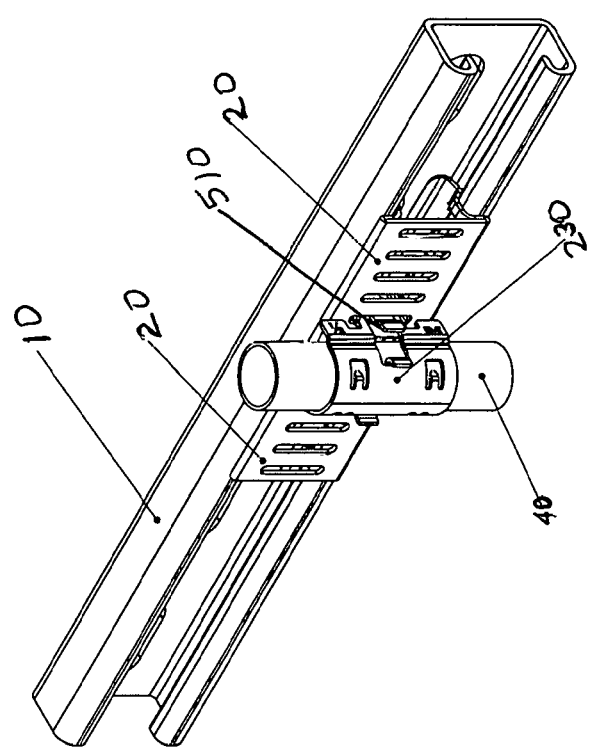
FIG. 25 is a perspective view of a strut receiver in an engaged position with a cage and strut member operable to attach to a pipe according to another embodiment.

FIGS. 13, 14, 15 illustrate one embodiment of the band 230 according to another embodiment. FIG. 23 is a perspective view of a strut receiver 20 in an engaged position with the band 230 and strut member 10 according to one embodiment. FIG. 25 is a perspective view of a strut receiver 20 in an engaged position with the band 230 and strut member 10 operable to attach to a pipe 30 according to another embodiment. During the engaged position, the knuckle 1350 hooks an upper surface and an edge of slot 510 to provide a high level of extraction force to restrict wing 1340 from withdrawing from slot 510.

The band may further include at least one insertion tab 1520. Insertion may be by a palm push. Alternatively a screw driver pushed down on insertion tab 1520 creates a force down the arm 1320, 1340 so screw driver pushes down to cause wing 1340 to engage. Pushing with palm may cause wings 1340 to go off center. Pushing with screw driver directs force downwards, with ergonomic handle.

Figure 22:
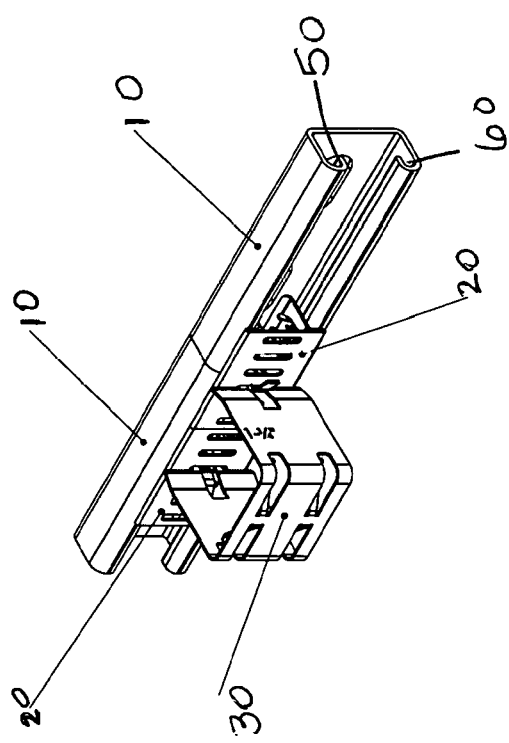
FIG. 22 is a perspective view of a strut receiver in an engaged position with a cage and strut member according to one embodiment.
Figure 24:
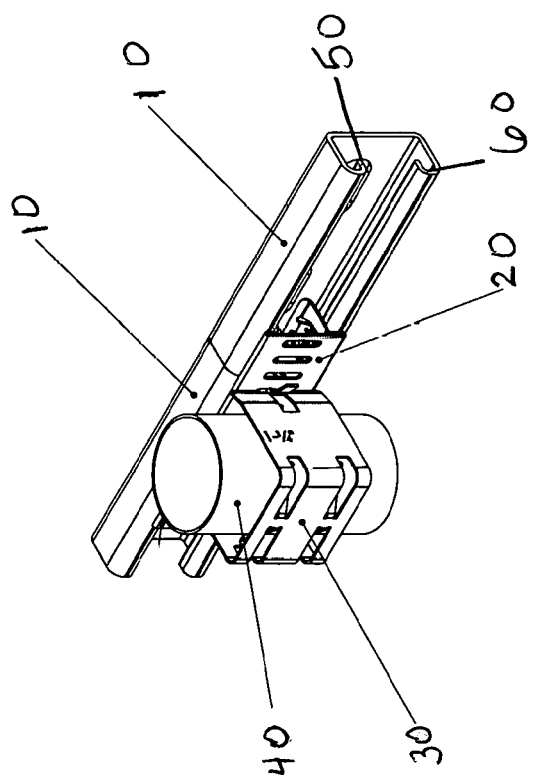
FIG. 24 is a perspective view of a strut receiver in an engaged position with a cage and strut member operable to attach to a pipe according to one embodiment.

FIGS. 16, 17, 18 illustrates a band comprising wings 1820 extending from the arms 1320, and a knuckle 1800 on each arm 1320 to snap and engage the wings 1820 into the receiver slots 510. FIG. 22 is a perspective view of a strut receiver 20 in an engaged position with the cage 30 and strut member 10 according to one embodiment. FIG. 24 is a perspective view of a strut receiver 20 in an engaged position with the band 30 and strut member 10 operable to attach to a pipe 30 according to another embodiment. The arms 1320 form a u-shape such that the horizontal portion of the U-shaped portion of the arms 1320 has a wing 1820 extending from the arms 1320. The wings 1820 engage the receiver slots 510 with a knuckle 1800 such that the knuckle pushes the wing 1820 inward during insertion into the slot 510. As the knuckle 1800 pinnacle passes through the slot 510, the knuckle 1800 snaps out until the cradle 1830 portion of the wing 1820 rests on the inside of slot 510 during an engaged position. According to one embodiment, the knuckle 1800 further comprises a depression 1840 on each knuckle 1800 to allow for low insertion force and a relatively high extraction force when engaging the receiver slots 510. According to this embodiment the depression 1840 engages an edge of the slot 510 and creates a pocket of engagement in combination with the outward springing force of the wing 1820.

Figure 19:
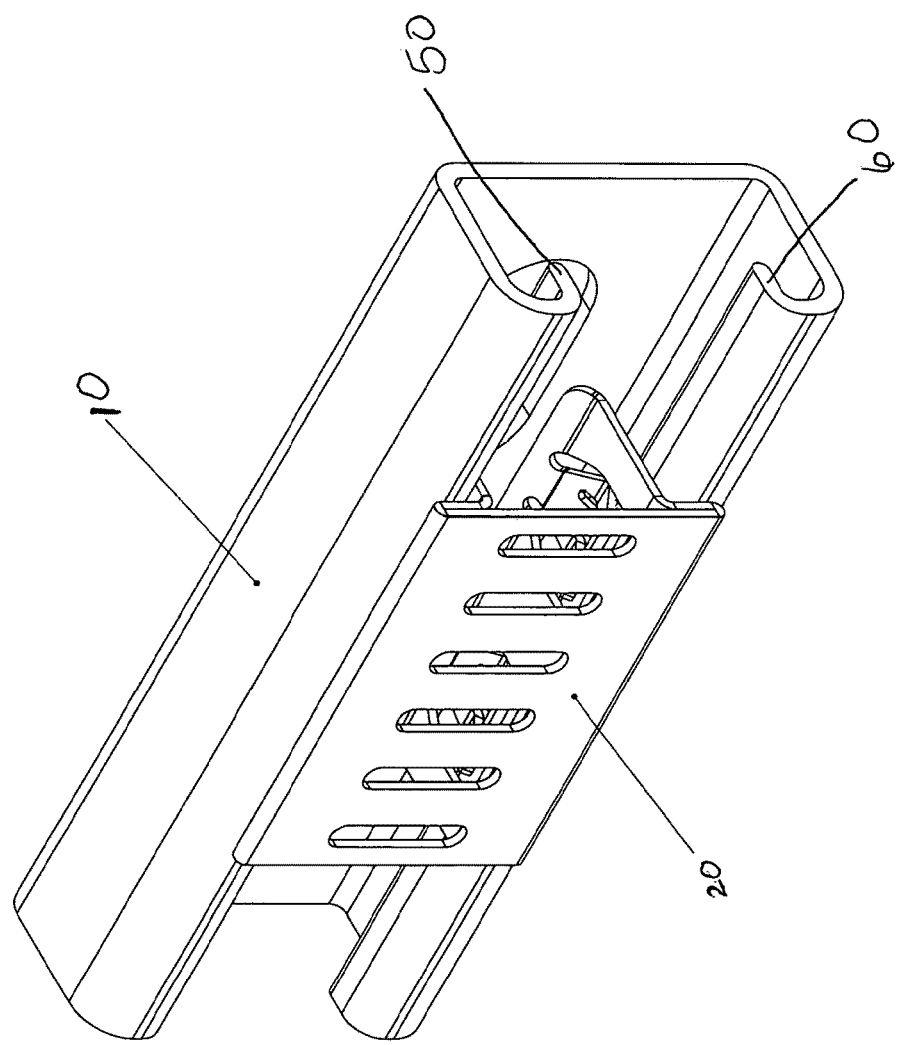
FIG. 19 is a perspective view of a strut receiver in an engaged position with a strut member according to another embodiment.
Figure 20:
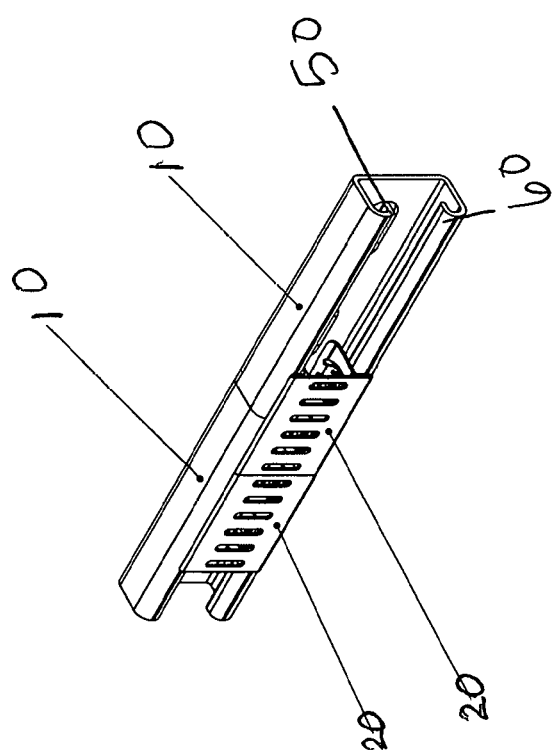
FIG. 20 is a perspective view of two strut receivers in an engaged position with a strut member according to another embodiment.
Figure 21:
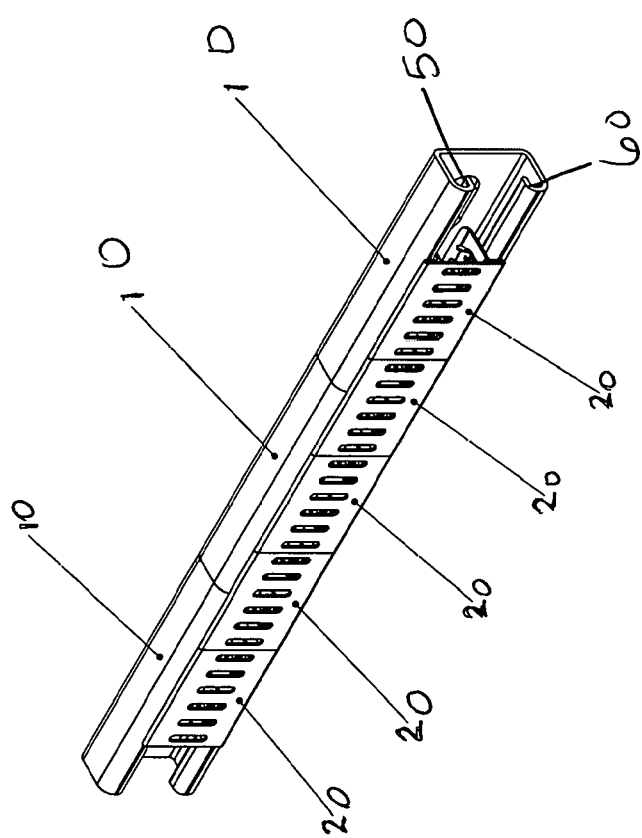
FIG. 21 is a perspective view of multiple strut receivers in an engaged position with a strut member according to another embodiment.

FIGS. 19-21 are examples of snapping in 1, 2, 3, 4 or more receivers 20 into one or more struts 10. FIG. 25 is a perspective view of a strut receiver 20 in an engaged position with a cage 230 and strut member 10 operable to attach to a pipe 40 according to another embodiment. FIG. 26 is a perspective view of a strut receiver 20 in an engaged position with multiple cages 230 and a strut member 10 operable to attach to multiple pipes 40 according to another embodiment. FIG. 27 is a side view of a strut receiver 20 in an engaged position with multiple cages 230 and a strut member 10 operable to attach to multiple pipes 40 according to another embodiment. Receivers 20 may span multiple struts 10 and conversely multiple struts 10 may span a receiver 20 and thus the receivers 20 are extremely flexible building blocks capable of supporting multiple pipe as shown in FIGS. 26 and 27.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A strut receiver for attachment to a slotted structural member comprising:
    a bottom portion having a plurality of slots;
    a first side connected to the bottom portion, the first side including a first inwardly curved tip opposite the bottom portion;
    a second side connected to the bottom portion, thereby forming a U-shaped structure with the first and second sides, the second side including a second inwardly curved tip opposite the bottom portion, such that the first and second inwardly curved tips curve toward each other;
    a plurality of first engagement springs each having an outward facing wing on the first side operable for springing attachment to a first rim on the slotted structural member; and
    a plurality of second engagement springs each having an outward facing wing on the second side operable for springing attachment to a second rim on the slotted structural member;
    wherein each outward facing wing has an open end opposite the inwardly curved tips, and further includes a depression having a depth thickness less than a thickness of each outward facing wing.

2. A strut receiver as in claim 1, wherein the wings further comprises at least one first side engagement region and the second side further comprises at least one second side engagement region.

3. A strut receiver as in claim 2, wherein the first side engagement region includes stamping the depression and the second side engagement region includes stamping the depression wherein the depression has a width.

4. A strut receiver as in claim 1, wherein the wings are operable for springing attachment to inside channel walls of the slotted structural member.

5. A strut receiver as in claim 1, wherein the wings further comprise a hook at an open end of the wing extending into an inside lip on the structural member.

6. A strut receiver as in claim 1, wherein the depression engages a slot of the slotted structural member.

7. A strut receiver as in claim 1, wherein the bottom portion has at least three slots.

8. A strut receiver as in claim 1, wherein the bottom portion has a nut operable for receiving a threaded fastener.

9. A strut receiver as in claim 1, wherein the first side and second sides are spaced apart to engage corresponding first and second sides of the structural member.

10. A strut receiver as in claim 1, wherein each engagement spring further comprises:
    curved arms extending from the bottom portion;
    a curved tip at an end of each arm opposite the bottom portion; and wherein the arms include the wings in between the bottom portion and the curved tip.

11. A strut receiver as in claim 10, wherein the wings include sheer tabs to snap into a rim on the slotted structural member and wherein the arms engage a rim edge on the slotted structural member.

12. A strut receiver assembly for springing attachment to a slotted structural member comprising:
    a strut receiver;
        a bottom portion having a plurality of slots;
        a first side connected to the bottom portion, the first side including a first inwardly curved tip opposite the bottom portion;
        a second side connected to the bottom portion, thereby forming a U-shaped structure with the first and second sides, the second side including a second inwardly curved tip opposite the bottom portion, such that the first and second inwardly curved tips curve toward each other;
        a plurality of first engagement springs each having an outward facing wing on the first side operable for springing attachment to a first rim on the slotted structural member;
        a plurality of second engagement springs each having an outward facing wing on the second side operable for springing attachment to a second rim on the slotted structural member;
        wherein each outward facing wing has an open end opposite the inwardly curved tips, and further includes a depression having a thickness less than a thickness of each outward facing wing; and
    a band having a bottom portion, a first side having a first arm for engaging a first receiver slot of the plurality of slots and a second side having a second arm for engaging a second receiver slot of the plurality of slots.

13. A strut receiver assembly as in claim 12, further comprising:
    a wing extending from the arms;
    a knuckle on each wing to snap the wings into the receiver slots.

14. A strut receiver assembly as in claim 13, further comprising a depression on each knuckle to allow for low insertion force and a relatively high extraction force when engaging the receiver slots.

15. A strut receiver assembly as in claim 13, wherein the band further comprises a servicing tab on each wing for removably retaining the band into the receiver slots.

16. A strut receiver assembly as in claim 12, wherein the band bottom portion further comprises a plurality of tensioner prongs to engage a conduit when the band is in an engaged position with the receiver.

17. A strut receiver assembly as in claim 12, wherein each arm on the band has a tapered flange.

18. A strut receiver assembly as in claim 12, wherein each arm on the band has a shoulder stop.

19. A strut receiver assembly as in claim 12, wherein each arm on the band has a curved tip at the end of the arm.

20. A strut receiver assembly as in claim 12, wherein the band further includes at least one insertion tab.

21. A strut receiver assembly as in claim 12, wherein the wings further comprises at least one first side engagement region and the second side further comprises at least one second side engagement region.

22. A strut receiver assembly as in claim 21, wherein the depression is stamped to form a width.

23. A strut receiver assembly for springing attachment to a slotted structural member comprising:
   a strut receiver;
   a bottom portion having a plurality of slots;
      a first side connected to the bottom portion;
      a second side connected to the bottom portion, thereby forming a U-shaped structure with the first and second sides;
      a plurality of first engagement springs each having an outward facing wing on the first side operable for springing attachment to a first rim on the slotted structural member;
      a plurality of second engagement springs each having an outward facing wing on the second side operable for springing attachment to a second rim on the slotted structural member; and
      a band having a bottom portion, a first side having a first arm for engaging a first receiver slot of the plurality of slots and a second side having a second arm for engaging a second receiver slot of the plurality of slots,
   wherein the first arm on the band engages a slot of the plurality of slots on the strut receiver and the second arm on the band engages a slot of the plurality of slots on a second strut receiver.

* * * * *